Oct. 29, 1968          J. F. BLUM ET AL          3,408,524
                    SPARKPLUG AND SEAL THEREFOR
                       Filed July 8, 1966
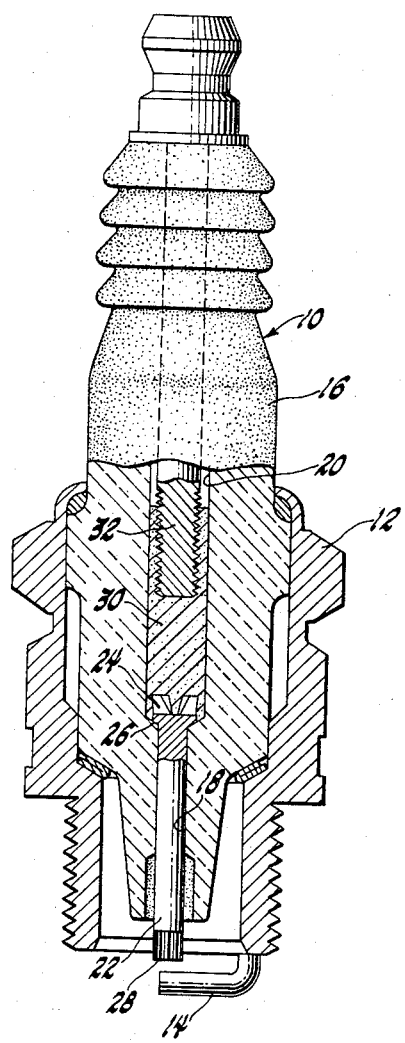
INVENTORS
Jack F. Blum
Robert G. Fournier &
Patrick N. Kesten
Peter P. Kozak
ATTORNEY

United States Patent Office 3,408,524
Patented Oct. 29, 1968

3,408,524
SPARKPLUG AND SEAL THEREFOR
Jack F. Blum and Robert G. Fournier, Flint, and Patrick N. Kesten, Davison, Mich., assignors to General Motors Corporation, Detroit, Mich., a corporation of Delaware
Filed July 8, 1966, Ser. No. 563,775
5 Claims. (Cl. 313—145)

ABSTRACT OF THE DISCLOSURE

An electrical conductive hermetic glass seal in the centerbore of a ceramic insulator adapted to operate at temperatures up to 1500° F. An example of this invention is a glass seal formed by heating a composition containing 60 weight percent copper powder, 6.5 weight percent silicon powder and 33.5 weight percent glass powder in a sparkplug insulator centerbore.

This invention relates to an improved ceramic-to-metal conductive glass seal for sparkplugs and the like.

It is common practice in the sparkplug art to form a part of the center electrode conductive path which extends through the insulator of a fused mass of glass and conductive material which bonds to the ceramic, the center electrode and the terminal screw, thereby forming an electrically conductive hermetic seal. Such seals are shown, for example, by United States Patents 2,106,578 issued to Karl Schwartzwalder and William Shuford Kirk, and 2,248,415 issued to Karl Schwartzwalder and Alexander S. Rulka. The latter patent discloses a seal consisting of about 50% copper powder and 50% glass. The composition which is presently most commonly used for conductive glass seals in high production automotive-type sparkplugs consists of about 58% copper and 42% glass. In practice a seal of this type is formed by first positioning the metal center electrode in the lower part of the insulator centerbore, injecting into the centerbore over the top of the center electrode a charge of the metal-glass seal mixture in powder form, inserting a metal terminal screw into the centerbore and then heating so as to cause the glass seal mixture to soften while simultaneously pressing down on the terminal screw. In this manner pressure is applied to the softened glass material to cause it to densify and to bond to the insulator, the center electrode and the terminal scre. It has been found that the application of pressure to the seal while it is in the softened condition is essential for the reasons indicated, i.e., to assure non-porosity and good bonding. However, by reason of such pressure having been applied, the finished hardened seal is in something of a stressed condition and if the seal is reheated to a certain temperature, it will rapidly expand and lose its sealing properties. The temperature to which the seal must be reheated to create such condition is referred to as the "backup temperature" and is, of course, characteristic of the particular seal composition used. The fact is, however, that for all glass sealing compositions heretofore known, for example those shown in the aforementioned prior patents, the backup temperature is very much lower than the temperature to which the sealing material must be initially heated in order to cause softening during manufacture. As a typical example, the sealing material mixture consisting of 58% copper powder and 42% borosilicate glass powder presently in common use requires heating to 1500–1600° F. to cause softening during processing, and the seal so formed has a backup temperature of 1250 to 1350° F. This can be a problem since under severe operating conditions or improper plug installation, the temperature at the location of the seal can reach a temperature higher than 1350° F. thereby causing a permanent failure of the seal. It is a relatively simple matter, of course, to formulate a seal composition with a somewhat higher initial softening temperature and with a commensurately somewhat higher backup temperature. However, this is not a satisfactory solution to the problem for the reason that the metal parts involved cannot tolerate processing temperatures much in excess of 1700° F. and it would be prohibitively expensive to make such parts of a more resistant metal.

It is a primary object of this invention to provide a hermetic conductive glass seal which is operative at temperatures up to 1500° F. without initially heating the seal mixture above 1600° F. It is another object of this invention to provide a seal which is operative at temperatures up to 1500° F. which can be formed at low cost utilizing standard sparkplug manufacturing techniques.

These and other objects are accomplished by a metal-glass sealing material mixture containing silicon. The composition of the conductive metal-glass seal consists essentially of 50 to 65 weight percent copper, 25 to 40 weight percent glass and 2 to 10 weight percent silicon. When a sparkplug containing the composition described above is heated and pressed with a terminal screw at a seal temperature between 1500 and 1600° F., the resulting fused mass upon cooling forms a hermetic conductive glass seal which is durable and operative up to a temperature of at least 1500° F., a temperature which is seldom exceeded at the seal location during sparkplug operation even under severe operating conditions.

Other objects and advantages of this invention will be apparent from the following detailed description, reference being made to the accompanying drawing wherein a preferred embodiment of this invention is shown.

Referring now to the drawing the sparkplug 10 comprises a conventional outer metal shell 12 having a ground electrode 14 welded to the lower end thereof. Positioned within the metal shell 12 and secured in the conventional manner is an insulator 16. The ceramic insulator 16 should preferably be of a high alumina base material containing upwards of 85% aluminum oxide such, for example, as covered by United States Patent 2,760,875 issued to Karl Schwartzwalder and Helen Blair Barlett. Such an insulator has excellent mechanical strength and heat shock resistance along with the ability to form an excellent bond with glass, all these characteristics being of considerable advantage in forming the conductive seal of this invention. The insulator 16 is formed with a centerbore having a lower portion 18 of relatively small diameter, and an upper portion 20 of lager diameter which are connected by insulator centerbore ledge 26. Positioned in the lower portion 18 of the insulator centerbore is the center electrode 22. The center electrode 22 has an enlarged head 24 at the upper end thereof which rests on the insulator centerbore ledge 26 and a serrated lower end 28 thereof projecting beyond the lower tip of the insulator 16. Positioned in the upper portion 20 of the insulator centerbore is the terminal screw 32. A metal-glass seal 30 forms a hermetic conductive seal in the insulator centerbore portion 20. The conductive metal-glass seal 30 is bonded to the center electrode head 24, the terminal screw 32 and the inner walls of the ceramic insulator to provide an electrically conductive path from the terminal screw 32 to the center electrode 22 and to provide a hermetic seal in the insulator centerbore portion 20.

In accordance with the present invention the metal-glass seal 30 is a dense, fused mass of copper, silicon and glass consisting essentially of 50 to 65 weight percent copper, 2 to 10 weight percent silicon and 25 to 40 weight percent glass. The concentration of the copper should be 50 to 65 weight percent in order to obtain a seal with a resistance of less than one ohm, the resistance commonly used in sparkplug systems.

The presence of 2 to 10 weight percent silicon in the metal-glass seal composition enables the glass seal to have a higher backup temperature, for example in the range of 1500 to 1600° F. Silicon concentrations of less than 2% have little effect on the high temperature stability of the seal. Seals having silicon concentrations greater than 10% form excessive amounts of copper silicon alloy which tends to extrude during the hot pressing thereby causing the seal to leak during actual engine operation. We are unable to completely describe the theory or reasons why the presence of silicon causes the unexpected increase in the backup temperature of the metal-glass seal. It has been observed that when silicon is intimately blended with glass and heated to a temperature between 1500 and 1600° F. to form the seal, a volatile constituent is released from the glass. The removal of this volatile constituent eliminates subsequent gas evolution which normally occurs upon reheating the seal to a temperature of 1300° F. or higher. This gas evolution that normally occurs upon reheating contributes to a seal having a low backup temperature. It has also been observed that silicon apparently alloys to some extent with copper to form a copper-silicon alloy which at low concentrations apparently contributes to a high backup temperature.

The glass in the metal-glass seal is the conventional borosilicate-type glass commonly known as Pyrex, which is presently being used in the production of automotive sparkplugs. The composition of a preferred borosilicate glass is 65% by weight $SiO_2$, 23% by weight $B_2O_3$, 5% by weight $Al_2O_3$ and 7% by weight $Na_2O$. This glass will be hereafter referred to as glass (A). Other glass frit compositions may be used in the seal as long as they soften at a temperature between 1500° F. and 1600° F. The concentration of the glass in the metal-glass seal range is from about 25 to 40 weight percent, at least 25 weight percent glass is required to form a hermetic seal. The mesh size of the glass powder does not appreciably affect the performance of the seal, a mesh size of 200 for the glass powder was found to be satisfactory.

Another component which may be added if desired in the metal-glass seal composition is a binder. A small amount of organic binder such as hydrogenated cottonseed oil may be admixed with the powder and the mixture then compressed into a self-sustaining pellet which will serve as a convenient manner of inserting the desired amount of powdered mixture into the insulator centerbore. The organic binder, of course, decomposes and goes off as a gas during the heating and pressing operation. The amount of binder in the mixture ranges from 1 to 3%. Other binders which may be used are carboxyl methyl cellulose, 1201 wax, dextrin and the like.

A preferred embodiment of the present invention is a glass seal mixture having a composition of 60 weight percent copper powder, 6.5 weight percent silicon and 33.5 weight percent glass (A). This metal-glass powder mixture is mixed with 1 part hydrogenated cottonseed oil, wetted with a dextrin solution and then placed in the insulator centerbore and tamped. The metal terminal screw is then placed into the centerbore and the glass seal mixture is heated to a temperature of 1500° F. to 1700° F. As the glass seal mixture is softened, the terminal screw is pressed down into the soft glass seal mixture. Upon cooling, a hermetic conductive seal is formed. This seal has to be reheated to a temperature above 1500° F. before it loses its sealing properties; that is, the backup temperature of this seal is higher than 1500° F. As mentioned earlier, the backup temperature of a typical metal-glass seal presently being used in automotive sparkplugs containing 58% copper and 42% borosilicate glass is of the order of 1300° F.

Another example of this invention is a glass seal composition containing 50 weight percent copper powder, 10 weight percent nickel powder, 33.5 weight percent glass and 6.5 weight percent silicon powder. The conductive metal-glass seal formed from this seal mixture composition had a backup temperature in the range of 1550° to 1650° F.

While the invention has been described in terms of a preferred embodiment, it is to be understood that it is not limited thereby except as defined in the following claims.

What is claimed is:

1. A sparkplug comprising a ceramic insulator having a centerbore therethrough, a metal member in said centerbore and a dense, fused, electrically conductive mass bonded to said metal member and bonded to said ceramic insulator to form a hermetic seal in said centerbore, said hermetic seal adapted to operate hermetically at temperatures up to 1500° F., said mass consisting essentially of 50 to 65 weight percent copper powder, 2 to 10 weight percent silicon and 25 to 40 weight percent glass.

2. A sparkplug as described in claim 6 wherein said mass contains 5 to 8 weight percent silicon.

3. A sparkplug comprising a ceramic insulator having a centerbore therethrough, a center electrode in said centerbore, a terminal screw in said centerbore in spaced relation to said center electrode, and a dense, fused, electrically conductive mass positioned in said centerbore bonded to said terminal screw and said center electrode and to said ceramic insulator to form a hermetic conductive seal in said centerbore, said hermetic seal adapted to operate hermetically at temperatures up to 1500° F., said mass consisting essentially of 50 to 65 weight percent copper powder, 2 to 10 weight percent silicon and 25 to 40 weight percent glass.

4. The combination of a fused glass mass and a ceramic insulator centerbore wall wherein the fused glass mass cooperates with the wall to form an electrically conductive hermetic seal in said centerbore, said fused glass mass consisting essentially of 50 to 65 weight percent copper powder, 2 to 10 weight percent silicon and 25 to 40 weight percent glass, said seal adapted to operate at temperatures up to 1500° F.

5. A combination as described in claim 4 wherein said fused glass mass contains 5 to 8 weight percent silicon.

References Cited

UNITED STATES PATENTS 2,415,036  1/1947  Quinn _____ 252—512

JAMES W. LAWRENCE, *Primary Examiner.*

R. F. HOSSFELD, *Assistant Examiner.*